Sept. 22, 1959     E. BAY ET AL     2,904,976
FLEXIBLE COUPLING
Filed Sept. 23, 1957
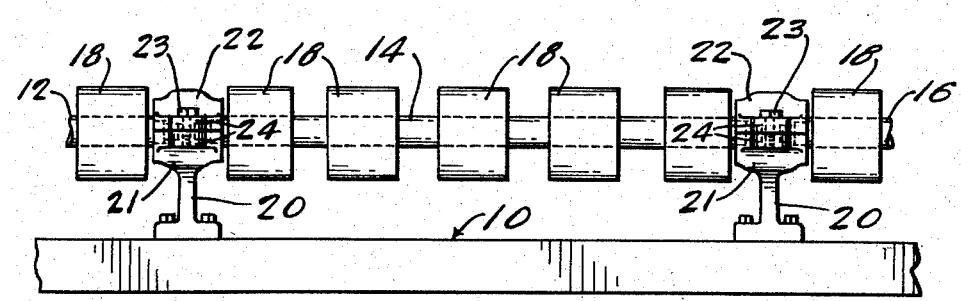
FIG-1-
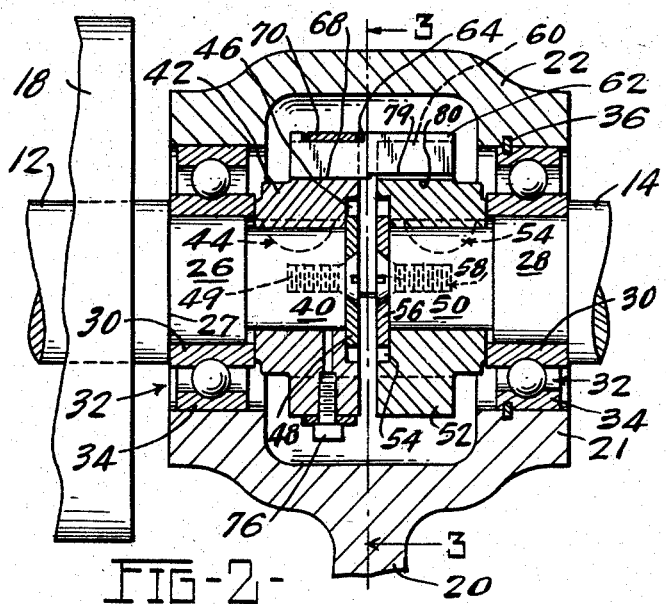
FIG-2-
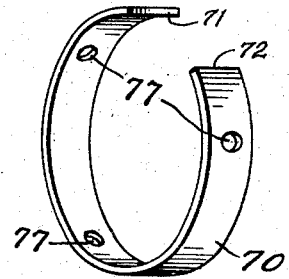
FIG-5-
FIG-4-
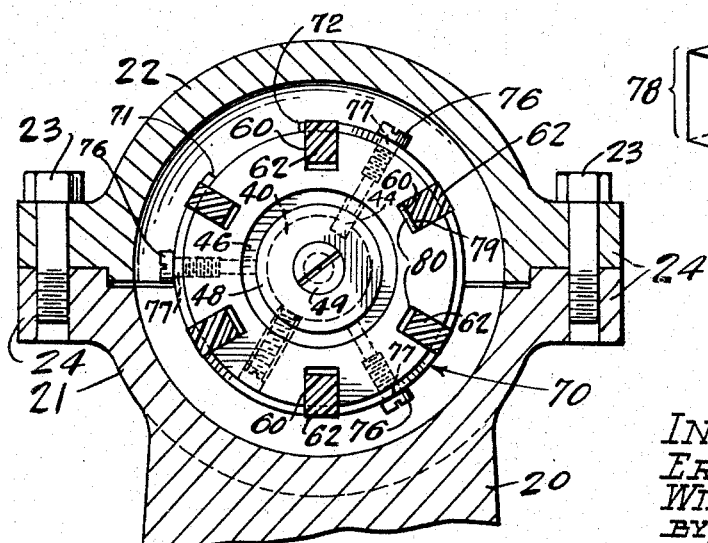
FIG-3-
INVENTORS:
ERNEST BAY,
WILLIAM B. KELLEY.
BY
ATTYS.

United States Patent Office 2,904,976
Patented Sept. 22, 1959

2,904,976

FLEXIBLE COUPLING

Ernest Bay, Manville, and William B. Kelley, Pawtucket, R.I., assignors to Owens-Corning Fiberglas Corporation, a corporation of Delaware Application September 23, 1957, Serial No. 685,636

14 Claims. (Cl. 64—27)

This invention relates to power transmitting mechanism and more especially to a flexible coupling for establishing power transmitting connection between substantially aligned driving and driven means or shafts.

Several forms of flexible coupling devices adapted to connect shafts arranged in substantial axial alignment have been developed and used but such couplings are subject to excessive wear and in a short time permit lost motion between the shafts. In installations where several shafts are connected to transmit torque or rotating forces without lost motion yet permitting certain flexibility to compensate for slight misalignment of the shafts, the flexible couplings heretofore used are not satisfactory. Such coupling devices should be constructed to permit the removal of a shaft unit or section without disturbing or dismantling adjacent shaft sections.

In the textile field, twister mechanisms are employed for twisting filaments or threads together to form yarns, and mechanisms of this character employ a plurality of filament or thread feeding and twisting units in which each group of threads or filaments to be twisted into a yarn are fed to the twister spindle by a feed roll. A large number of feed rolls are arranged in longitudinally aligned relation and the rolls are assembled in small groups, each group being mounted upon a shaft section and the shaft sections connected by couplings whereby all of the sections are concomitantly driven from a common power source.

For example five feed rolls may be assembled upon a shaft section of approximately two feet in length and a number of longitudinally-aligned shaft section and feed roll assemblies connected together by couplings. It has been conventional practice to employ a coupling between adjacent shaft sections of a twister thread feeding means wherein a roller type chain straddles a pair of sprockets respectively mounted upon the adjacent ends of shaft sections for transmitting rotation from one shaft section to the adjacent section. The chains and sprockets soon become worn and lost motion or backlash develops which, cumulated throughout the length of several shaft sections and roll assemblies, reaches a magnitude which impairs the twisting operations and hence affects the quality of the yarn.

The present invention embraces the provision of a flexible coupling which, while providing for slight misalignment of generally axially arranged shafts, establishes a positive drive between adjacent shafts or shaft sections in which lost motion or backlash is eliminated.

Another object of the invention is the provision of a partible coupling means usable for connecting a plurality of aligned shafts wherein one shaft may be removed without interfering with the mountings of adjacent shafts.

Another object of the invention is the provision of a power transmitting coupling arranged between driving and driven units, the construction including coupling blocks or members adapted to be readily assembled and disassembled with other components of the coupling construction whereby a unit disposed between two couplings may be removed and replaced without dismantling adjacent mechanism.

Another object of the invention is the provision of a flexible coupling embodying driving or coupling blocks or segments preferably formed of resin or plastic arranged to provide for misalignment of adjacent shafts and adapted to transmit torque or rotating forces without binding and without lost motion or backlash of the components of the coupling.

Another object of the invention is the provision of a flexible coupling wherein coupling components carried by adjacent shafts are connected together by means of blocks or segments arranged to be assembled or removed in a radial direction from the shaft components so as to effect a disconnection of the shafts in a minimum of time without the use of special tools.

Still another object of the invention is the provision of a structural arrangement and combination of coupling components providing a strong and durable coupling capable of long life without developing lost motion.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

Figure 1 is a front elevational view of a portion of a textile twisting apparatus showing an arrangement of shaft sections or units adapted to be connected together by the coupling means of the invention;

Figure 2 is a longitudinal sectional view through one of the coupling structures of the invention;

Figure 3 is a vertical transverse sectional view taken substantially on the line 3—3 of Figure 2;

Figure 4 is an isometric view illustrating a form of coupling block forming a component of the coupling construction of the invention, and Figure 5 is an isometric view of the coupling block retaining means.

While the invention has been illustrated herein as particularly adapted for connecting adjacent shafts or shaft units of a textile thread twisting machine, it is to be understood that the coupling construction may be used with other apparatus where it is desired to transmit power from a driving a driven means arranged in substantially axially aligned relation.

Referring to the drawings in detail, and initially to Figure 1, there is illustrated a frame member 10 of a textile twisting machine, the frame member 10 extending substantially parallel with the axis of shafts or shaft sections 12, 14 and 16. Each of the shafts or shaft sections 12, 14 and 16 is of a length of approximately two feet in a conventional twisting machine and each shaft supports a plurality of feed rolls 18, there being five rolls carried by each shaft section in the arrangement illustrated in Figure 1. The feed rolls 18 are adapted to be engaged by the threads, filaments or other linear materials which are to be twisted together, the rolls serving to advance the threads or filaments to the twister spindles (not shown).

In a twister of conventional construction, there may be twenty or more shaft sections in generally axially aligned relation driven from a common source of power connected with one of the sections. Mounted upon the frame member 10 in the region of each coupling device is a shaft supporting member or stand 20 equipped with a bearing supporting portion 21 and a closure or cap 22, the cap being secured to the adjacent stand or member 20 by means of bolts 23 extending into threaded openings in boss portions 24 formed on the stand.

The ends of the adjacent shafts or shaft units 12 and 14 are formed respectively with portions 26 and 28 of reduced diameter which accommodate the inner races 30 of anti-friction or ball bearings 32. Each of the stands or supports 20 and closure or cap 22 are bored to accommodate the outer race 34 of each of the bearings 32 as shown in Figure 2. The outer race 34 of the bearing mounted on the tenon 28 of shaft 14 is formed with a recess adapted to receive a snap ring 36 arranged to extend into an annular recess provided in the stand 20 and cap 22 when these elements are in assembled relation to prevent endwise movement of the bearing race and associated shaft.

The coupling is inclusive of co-axially arranged driving and driven members or heads associated with the shafts. The shaft 12 is formed with a tenon 40 adapted to receive and support a member, head or hub 42 secured on the shaft by means of a key 44. The hub 42 abuts the inner race 30 of the adjacent ball bearing to maintain the race against the ledge or shoulder 27 on shaft 12. The head 42 adjacent the end of the tenon 40 of the shaft is provided with a recess 46 adapted to accommodate a circular plate 48 which is secured to the tenon 40 by means of a screw 49 engaging in a threaded bore in the tenon 40. The retaining plate 48 serves to prevent endwise movement of the head component 42 relative to the shaft 12.

The shaft 14 is formed with a tenon 50 adapted to accommodate a head or hub component 52 of substantially the same construction as the head 42 and is secured to the tenon 50 by means of a key 54. The head 52 is recessed as at 54 to accommodate a retaining plate 56 of the same construction as the plate 48, the plate 56 being secured to the tenon 50 by means of a threaded member or screw 58.

Each of the heads or coupling components 42 and 52 is formed of metal and is provided with a plurality of spaced, radially-arranged axially-extending slots or recesses 60, each of the slots being defined by parallel walls as shown in Figure 3. The slots in each of the heads 42 and 52 are adapted to be in aligned registration so as to receive and accommodate blocks or members 62, which, in the embodiment illustrated, are of the configuration shown in Figures 2 and 4. Each of the blocks 62 is preferably fashioned of resinous or plastic material which is substantially incompressible, and moldable polyamide resins (nylon) have been found to be ideal materials for the blocks.

Each of the blocks is of a width to be snugly received within a pair of slots 60 so that there is no clearance, lost motion or backlash between the side surfaces of the blocks 62 and the walls of the slots 60. As shown in Figure 2, each block 62 extends axially through two registering slots in the coupling heads and is in full area contact with the walls of the slot so as to establish a positive drive between the heads and the driving blocks to transmit torque from one head to the other.

Each of the blocks 62 is formed in its outermost region with a recess 64 to accommodate a means for securing the blocks to the head 42. The innermost surface region 66 of each block is adapted to engage the bottom surface 68 of each of the slots or recesses 60 in the head 42 to properly position the block.

Extending partially around the periphery of the head 42 is a circular member or band 70 which engages in the recesses 64 of the driving blocks 62 in the manner shown in Figures 2 and 3. In the embodiment illustrated, there are six driving blocks substantially equally spaced circumferentially in the slots in the heads connecting the heads 42 and 52 as shown in Figure 3. The block retaining member 70 is of a length to partially surround the head 42 and embrace the six driving blocks in the manner shown in Figure 3, the ends 71 and 72 of the band 70 terminating at the regions indicated in Figure 3 so that the end regions of the band extend over but not substantially beyond the adjacent blocks.

The head 42 is provided with a plurality of threaded openings to accommodate securing screws 76 which extend through openings 77 in the band or block retaining member 70 to secure the band to the hub or head 42 in the manner shown in Figure 3. Each of the blocks 62 is provided with a portion 78 of reduced depth, the surface 79 thereof being spaced radially outwardly from the bottom walls of a slot 60 in the head 52 providing radial clearance space 80 as shown in Figures 2 and 3. The clearance spaces 80 facilitate transverse movement of the coupling head 52 with respect to the driving blocks 62 to compensate for any slight misalignment of the shafts 12 and 14.

From examination of Figures 2 and 3, it will be apparent that a positive drive or power transmitting means is provided through the partible coupling construction herein described whereby no lost motion or backlash occurs between the driving blocks and the coupling heads 42 and 52.

The steps in disassembling the driving blocks from the coupling heads 42 and 52 to effect removal of a shaft section is as follows: The caps 22 are first removed and the screws 76 are removed from the head 42 so that the circularly shaped band 70 is free to be rotated around the exterior periphery of the head 42. By rotating the band 70 in increments of approximately one sixth of the periphery of the head 42, each of the driving blocks 62 may be successively removed yet retaining the circularly shaped band 70 around the periphery of the head 42.

After the blocks 62 of the coupling construction adjacent the ends of a shaft section have been thus disassembled from the slots 60, the shaft between the dismantled couplings, the bearings 32 at each end of the shaft section and the heads 42 and 52 of the coupling components secured on the tenons at opposite ends of the shaft section may be lifted out of the stands 20.

In replacing the shaft section, the shaft is fitted into position between adjacent stands 20 with the ball bearings 32 in proper relation in the semicircular surfaces formed in the stands 20. The driving blocks 62 are then successively engaged in the slots 60 by intermittently rotating the securing band 70 through one sixth of a revolution at each step to expose a pair of aligned slots 60 into which a block 62 is inserted. As each block is inserted, the band 70 is slidably moved one sixth of a revolution to enable the insertion of the next succeeding block so that after the six blocks are assembled in the positions shown in Figure 3, the band 70 is secured to the head 42 by replacing the threaded members 76.

From the foregoing, it will be seen that a shaft section can be readily removed and replaced or reassembled in a minimum of time and without interfering with or disturbing adjacent shaft sections or the remaining coupling constructions. After the band 70 is securely fastened in position, the caps 22 may be replaced and the screws 23 drawn up to hold the bearings 32 and the shafts associated therewith in proper position.

With particular reference to Figure 2, it will be noted that the width of the block retaining band 70 is such as to snugly fit in the recesses 64 in the blocks to prevent endwise or axial movement of the shafts or blocks and in this manner the blocks are securely held to the head 42. Approximately one half of each driving block is in engagement in the slots in the head 52 and, through the radially arranged clearance spaces 80 established between the bottoms of the slots 60 in the head 52 and the surfaces 79 of the blocks, provision is thus made to compensate for slight misalignment of the shaft sections through relative transverse movement between the blocks 62 and the head 52.

Such relative movement however is very slight and does not result in any appreciable wear of the resinous driving blocks or the adjacent metal surfaces of the slots 60. Through the coupling construction hereinbefore described a large number of shafts may be joined together for transmitting rotating forces or torque without any backlash or lost motion between adjacent shafts.

Hence while the number of shaft sections may establish a power transmitting assembly totaling fifty or more feet in length, the shafts will be rotated simultaneously without any backlash so that yarns may be formed of uniform twist by reason of the elimination of any relative rotation of the thread feed rolls carried by the several shaft sections.

While the driving blocks 62 are preferably formed of nylon, viz. polyamide resins which includes polycaprolactam, it is to be understood that they may be formed of other suitable resins or plastics such as melamine resins, acrylic resins or other resins which may be molded or fabricated in solid block formation and which are substantially incompressible.

It has been found that it is preferable to fashion or mold the driving blocks of a transverse dimension slightly greater than the width of the slots 60 so that during initial assembly of the driving blocks in the slots they may be forced into the slots. The edge regions or junctures of the slot walls with the peripheries of the heads are comparatively sharp and the material of the blocks will be sheared by such edges to the exact width of the slot so as to assure a snug fit between the blocks and the walls of the slots.

It has also been found that relative sliding movement of the resinous blocks in contact with the metal of the heads due to possible slight misalignment of the shaft sections occurs with a minimum of friction and wear whereby the coupling is capable of long life without lubrication. It is to be understood that lubricant may be used in each coupling unit if desired.

It is apparent that, within the scope of the invention, modifications and different arrangements may be made other than is herein disclosed, and the present disclosure is illustrative merely, the invention comprehending all variations thereof.

We claim:

1. A coupling construction including, in combination, substantially co-axial driving and driven members, said members being formed with peripheral recesses in longitudinally aligned relation, blocks extending into the recesses forming an operative connection between said members, said blocks being insertible and removable by movement thereof in directions radially of the axis of the driving and driven members, and means partially surrounding one of said members and engageable with the adjacent outermost surfaces of the blocks for retaining the blocks in the recesses.

2. A coupling construction including, in combination, substantially co-axial driving and driven members, said members being formed with slots disposed in aligned relation, blocks formed of nonmetallic substantially incompressible material extending into the slots forming an operative connection between said members, said blocks being insertible and removable by movement thereof in directions radially of the axis of the driving and driven members, and a circularly shaped band extending partially around one of said members and coincident with a portion of the periphery of the said member and engageable with the adjacent outermost surfaces of the blocks for retaining the blocks in the slots.

3. A coupling construction including, in combination, substantially co-axial driving and driven members, said members being formed with spaced peripheral recesses in aligned relation, each of said recesses having parallel walls, blocks of substantially noncompressible resin extending into the recesses forming an operative connection between said members, and means partially surrounding the periphery of one of said members for retaining the blocks in the recesses in said members.

4. A coupling construction including, in combination, substantially co-axial driving and driven members, said members being formed with spaced peripheral recesses in aligned relation, the opposed walls of each of the recesses being in parallel relation, blocks formed of polyamide resin snugly fitting into the recesses forming an operative power transmitting connection without lost motion between said members, and means for retaining the blocks in the recesses in said members.

5. A coupling construction including, in combination, substantial co-axial driving and driven heads arranged to provide a partable driving connection, said heads being formed with peripheral recesses, blocks extending into the recesses forming a power transmitting connection between said heads, said blocks being insertible and removable by movement thereof in directions radially of the axis of rotation of the heads, means partially surrounding the periphery of one of the heads and engageable with the blocks for retaining the blocks in the slots, and means for securing the member retaining means to the periphery of the adjacent head.

6. A coupling for connecting driving and driven means including, in combination, a pair of axially spaced opposed heads adapted to be secured to said driving and driven means respectively and arranged to provide a partible driving connection therebetween, said heads being formed with recesses arranged in aligned relation; members formed of substantially rigid nonmetallic material disposed in the recesses and forming a driving connection between said heads, said members being insertible and removable by movement thereof in directions radially of the axis of rotation of the heads, means partially surrounding the periphery of one of the heads and engageable with the members for retaining the members in the recesses, and means for securing the member retaining means to the head.

7. A coupling for connecting driving and driven means, a pair of axially spaced opposed heads arranged to provide a partible driving connection therebetween, said heads being secured to said driving and driven means respectively, said heads being formed with peripheral recesses, rigid blocks formed of resinous material disposed in the recesses and forming a driving connection between said heads, said members being insertible and removable by movement thereof in directions radially of the axis of rotation of the heads, each of said blocks being formed with a recess, a band partially surrounding the periphery of one of the heads and engageable in the recesses in the blocks for retaining the blocks in the recesses in said heads, and means for securing the band to one of said heads.

8. A coupling of the character disclosed, in combination, a pair of heads adapted to be secured respectively to adjacent ends of generally aligned shafts, the peripheral regions of said heads being formed with circumferentially spaced slots having opposed parallel walls, the slots in one head being in aligned relation in a direction axially of the heads, a member disposed in each pair of aligned slots, said members being formed of resinous material and of a width to snugly fit in said slots without lost motion in directions peripherally of the heads, each of said members being formed with a recess, means extending partially around one of said heads and engageable in the recesses in said members for retaining the members in the slots, said members being spaced from the bottom surfaces of the slots in the other of said heads to provide for relative slidable movement in radial directions between said blocks and the head.

9. A coupling of the character disclosed, in combination, a pair of heads adapted to be secured respectively to adjacent ends of generally aligned shafts, the peripheral regions of said heads being formed with circumferentially spaced slots, the slots in one head being in aligned relation in a direction axially of the heads, a block disposed in each pair of aligned slots, said blocks being formed of resinous material and of a width to snugly fit in said slots without lost motion in directions peripherally of the heads, a circularly shaped band extending partially around the periphery of one of said heads and adapted to embrace and engage the outermost surfaces of all of said blocks for retaining the blocks in the slots, removable means for fastening the band to the adjacent head, the ends of said band being spaced to facilitate placement and removal of the blocks in the slots in radial directions by rotating the band relative to the heads.

10. A coupling of the character disclosed for connecting driving and driven shafts including, in combination, a pair of heads arranged to provide a separable connection between the driving and driven shafts, said heads being adapted to be secured to said driving and driven shafts respectively, each of said heads being formed with circumferentially spaced, axially extending slots, blocks formed of polyamide resin disposed in the slots and forming a drive connection between said heads, the inner surfaces of the blocks adjacent the bottoms of the slots in one of said heads being spaced to provide for relative radial movement of one head with respect to the other to accommodate misalignment of the driving and driven shafts, each of said blocks being formed with a recess, means extending into the recesses in said blocks and secured to the head adjacent the recesses for securing the blocks in the slots, said block retaining means extending partially around the adjacent head and being rotatably movable relative to the said head to facilitate successive withdrawal and replacement of said blocks in a direction radially of the heads.

11. A coupling of the character disclosed including, in combination, substantially co-axial driving and driven heads arranged to provide a separable connection, each of said heads being formed with circumferentially spaced, axially extending slots, blocks formed of resinous plastic disposed in the slots and forming a drive connection between said heads, the inner surfaces of the blocks adjacent the bottoms of the slots in one of said heads being spaced to provide for relative radial movement of one head with respect to the other to accommodate misalignment of the heads, each of said blocks being formed with a recess, means extending into the recesses in said blocks and secured to the head adjacent the recesses for securing the blocks in the slots in contact with the bottoms of the slots in said head, said block retaining means being rotatably movable relative to the said head to facilitate successive withdrawal and replacement of said blocks in directions radially of the heads.

12. A coupling for connecting driving and driven shafts including, in combination, a pair of heads adapted to be secured to said driving and driven shafts respectively, each of said heads being formed with peripherally spaced slots having parallel side walls, said slots extending axially of the heads and the slots in one head adapted to register with the slots in the other, substantially rectangularly shaped blocks of polyamide resin snugly disposed in said slots to establish a rotatable driving connection between the heads without lost motion in directions peripherally of the heads, the outer regions of the blocks adjacent one of the heads being formed with recesses, a block retaining means engageable in the recesses to secure the blocks to the adjacent head with the blocks in contact with the bottom surfaces of the recesses in said head, the inner surface regions of the blocks adjacent the other of the heads being spaced from the bottom surfaces of the slots to accommodate misalignment of the driving and driven shafts, said block retaining means being relatively movable to facilitate selective placement or removal of the blocks to establish or disestablish a driving connection between the driving and driven shafts, and removable means adapted to secure the block retaining means to one of the heads.

13. A coupling for establishing a partible connection between driving and driven shafts including, in combination, a pair of heads adapted to be secured to said driving and driven shafts respectively, each of said heads being formed with peripherally spaced slots, said slots being arranged axially of the heads and the slots in one head adapted to register with the slots in the other, blocks snugly disposed in said slots to establish a rotatable driving connection between the heads without lost motion in directions peripherally of the heads, a circularly shaped band extending partially around the periphery of one of the heads to secure the blocks in the slots, the inner surface regions of the blocks adjacent the other of the heads being spaced from the bottom surfaces of the slots to accommodate misalignment of the driving and driven shafts, said band being slidable peripherally of the adjacent head to facilitate selective placement or removal of the blocks in directions radially of the heads to establish or disestablish a driving connection between the driving and driven shafts, and removable means adapted to secure the band in position to engage all of the blocks when the same are assembled in the slots.

14. A coupling for connecting driving and driven shafts including, in combination, a pair of heads adapted to be secured to said driving and driven shafts respectively, each of said heads being formed with peripherally spaced slots having parallel side walls, said slots extending axially of the heads and the slots in one head adapted to register with the slots in the other, substantially rectangularly shaped blocks snugly disposed in said slots to establish a rotatable driving connection between the heads without lost motion in directions peripherally of the heads, the outer regions of the blocks adjacent one of the heads being formed with recesses, a band extending partially around the periphery of the head and engageable in the recesses to secure the blocks to said head with the blocks in contact with the bottoms of the slots, the inner surface regions of the blocks adjacent the other of the heads being spaced from the bottom surfaces of the slots to accommodate misalignment of the driving and driven shafts, said band being slidable peripherally of the adjacent head to facilitate selective placement or removal of the blocks in directions radially of the heads to establish or disestablish a driving connection between the heads, and removable means adapted to secure the band in position to engage all of the blocks when the same are assembled in the slots.

References Cited in the file of this patent

UNITED STATES PATENTS

| | | |
|---|---|---|
| 1,230,646 | Arndt | June 19, 1917 |
| 1,393,582 | Steenstrup | Nov. 1, 1919 |
| 1,587,403 | Nicholson | June 1, 1926 |
| 1,591,063 | Smith | July 6, 1926 |
| 1,634,965 | Taylor | July 5, 1927 |
| 2,479,278 | Tessendorf et al. | Aug. 16, 1949 |